UNITED STATES PATENT OFFICE 2,282,782

ENHANCED OLIVE FLAVORED OIL

Sidney Musher, New York, N. Y., assignor to Musher Foundation Incorporated, New York, N. Y., a corporation of New York No Drawing. Application January 9, 1942, Serial No. 426,229

9 Claims. (Cl. 99—123)

The present invention relates particularly to olive infused and olive blended glyceride oils and to the enhancement of the flavor and odor characteristics of those glyceride oils.

A refined glyceride oil, such as a deodorized corn oil, soya bean oil, cottonseed oil or peanut oil may be infused with an olive paste and particularly with an olive paste consisting of dehydrated, macerated, low moisture containing, shrivelled, salted olives.

In the preferred procedure the olives are salted, for example for a period of 15 to 35 days, following which said olives may, where desired, be mechanically dried.

This paste then is combined with or infused into refined corn oil, soya bean oil, cottonseed oil, peanut oil or other seed and nut oil, followed by removal of the undissolved olive solids. It is found that this olive paste gives a highly desirable olive flavor to these refined oils and at the same time, will protect them against development of oxidative deterioration and rancidity for long periods of time.

It has, however, been found that in many instances the flavor and odor characteristics are not as fully developed in the refined deodorized seed and nut oils as is desired.

As a result, it is often necessary in some instances to rerun these refined oils several times with the macerated olive pastes.

In other instances, it has been found necessary to treat them with larger amounts of olive paste in order to develop the desirable flavor and odor characteristics therein.

It is among the objects of the present invention, therefore, to enhance the development of flavor and odor characteristics in olive infused refined glyceride oils and particularly in olive infused refined corn oil, soya bean oil, cottonseed oil and peanut oil and to assure that the development of the olive flavor will remain uniform from batch to batch without prolonged or repeated infusion procedures and without the use of relatively large amounts of the olive paste for infusion purposes.

Another object is to produce an improved olive infused glyceride oil and particularly an improved olive infused seed and nut oil which will have developed therein flavor and odor characteristics to a much higher degree than hitherto thought possible.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that olive and olive oil flavor and odor characteristics may be emphasized and enhanced in olive infused glyceride oils, particularly the refined deodorized seed and nut oils, by incorporating therein small amounts of benzaldehyde, but insufficient to develop a characteristic benzaldehyde odor. At the same time, the benzaldehyde appears to establish a uniformity of flavor from one batch to another.

The benzaldehyde, without giving its own characteristic flavor or odor to the oil, appears to develop and maintain in unaffected and enhanced condition the essential delicate olive aroma and flavor, the exact chemical constitution of which is not known.

It does not appear that the benzaldehyde acts as a negative oxidation catalyst nor does it appear to act as a flavoring constituent itself because the characteristic benzaldehyde or "almond" odor and flavor are not noticeably present in the treated oil. On the other hand, the infused oil after treatment in accordance with the present invention has an enhanced olive flavor so that the amount of olives used for infusion may be reduced from 25% to 50% while at the same time the olive and olive oil flavored glyceride oil acquires a superior odor and flavor.

In accordance with the present invention, after the infusion has been completed, a minute amount of benzaldehyde, less than 75 parts per million and preferably less than 40 parts per million, is added to and distributed uniformly throughout the oil.

In the preferred procedure, the benzaldehyde is added in proportions at least more than 5 parts per million and desirably between 20 and 30 parts per million, these quantities of benzaldehyde being insufficient to give to the glyceride oil any noticeable or detectable almond odor or flavor characteristic of benzaldehyde.

Although the benzaldehyde is preferably added to the oil after the infusion has been completed, it is also possible to include the benzaldehyde in the oil before or during the infusion process or the benzaldehyde may be added to the olive paste to be subsequently used in the infusion process.

In all cases, it is most important to add insufficient benzaldehyde to give any benzaldehyde or almond-like flavor or odor to the oil since the almond flavor as a rule overcomes and destroys the olive flavor and odor characteristics which it is desired to enhance in the oil.

This process has also been found valuable where the olives used for infusion are in their green or unripe, bitter and substantially inedible condition. The green olives may be processed with salt, or may be dehydrated just as picked from the trees. These unripe olives have a low olive oil content and contain less than 15% of oil.

Although the present invention is particularly directed to the use of benzaldehyde in combination with an olive infusion process, it has also been found to have a desirable application in connection with glyceride oil blends consisting of minor proportions of olive oil and major proportions of other glyceride oils such as corn oil, cottonseed oil, soya bean oil, peanut oil, sesame oil, etc., particularly in refined, deodorized condition.

These minute amounts of benzaldehyde and preferably less than 40 parts per million and more than 5 parts per million, may also be added to blends of glyceride oils and olive oil, and preferably to blends of refined deodorized seed and nut oils with minor amounts of virgin olive oil.

The benzaldehyde appears greatly to enhance and protect the olive oil flavor so that much smaller proportions of olive oil may be used for blending while at the same time retaining a desirable olive oil flavor in the finished blend.

Care must be exercised that the benzaldehyde is added in an insufficient amount to give the almond or benzaldehyde odor or flavor.

The oil thus obtained and carrying the enhanced olive flavor and odor characteristics may be utilized either for salads and cooking purposes or in the manufacture of mayonnaise, salad dressings and French dressings. These manufactured products will take on a highly desirable flavor and odor characteristic that is not obtainable when using oils that have been prepared by the usual blending procedures.

Less preferably, the benzaldehyde may also be utilized for direct addition to the salad dressing, mayonnaise or French dressing, particularly where the oil used in manufacturing these products has been prepared with minor amounts of olives, olive pastes, and/or olive oil, the benzaldehyde being added in amounts of between 5 parts per million and 75 parts per million and desirably between 5 parts per million and 40 parts per million.

It has also been found possible to add the minute amount of benzaldehyde direct to the olives during the curing or brining period. For example, the benzaldehyde may be added direct to the brine at the time the olives are cured, the addition being made in amounts ranging from 50 parts per million to 200 parts per million against the weight of the olives, and, where desired, the brine can be removed at the close of the brining period.

Desirably, however, more than 5 parts per million and less than 100 parts per million against the weight of the olives are added to the brine or sprayed on the olives in order to develop enhanced flavor and odor characteristics.

Where the olives are rubbed with or sprayed with an oil, such as olive oil, the benzaldehyde may be added direct to the oil in the desired amount before being sprayed or rubbed on the olives. In the case of the brined or salted down olives, the benzaldehyde is desirably added to the brine solution or mixed with the dry salt.

These olives may, where desired, then be macerated or ground, preferably with their pits, to produce the paste used for infusion.

This paste is then added either to the glyceride oil or to refined white mineral oil in a minor amount such as between 1% and 25% and desirably between 5% and 15%. The olive paste is then thoroughly agitated in the oil for a short period of time, desirably about 30 minutes to two hours, following which the undissolved olive solids are removed by centrifuging, filtration or other similar means. The infused oil will then have the unusual and enhanced olive flavor and odor characteristics described above.

It is also possible to obtain desirable results by adding from 5 to 75 parts per million of benzaldehyde to blends consisting of a major amount of refined, deodorized olive oil with a minor amount of virgin olive oil.

Together with or in lieu of the glyceride oil to which the benzaldehyde is added in the minor amount of less than 75 parts per million, refined white mineral oil may also be employed. For example, to an olive infused or olive oil blended refined white mineral oil may be added a relatively small proportion, desirably between 5 and 40 parts per million of benzaldehyde in order to enhance the olive or olive oil flavor.

For example, the benzaldehyde may be added to blends comprising small proportions of olive oil and large proportions of refined white mineral oil in an amount insufficient to give the characteristic benzaldehyde odor, such as less than 75 parts per million. The benzaldehyde may also be added in the minute amount to olive infused mineral oil whereby the olive flavor is enhanced as a result of the addition of the minute amount of benzaldehyde.

In lieu of adding benzaldehyde to the oil, it is also possible to add oil of bitter almonds or to develop the benzaldehyde in the oil by infusing it with or adding to it a drupe, preferably in ground form, such as ground bitter almonds, apricot kernels, plum kernels, nectarine kernels or apple seeds. The preferred drupe is bitter almonds.

When these ground drupes are added, a small amount of water must be added to the drupe in order to develop the benzaldehyde by the characteristic enzymic reaction.

It is also possible to mix the ground drupes with olive paste, the olive paste containing a small amount of water and the water being present in sufficient quantity to hydrolyze the drupe so as to form the benzaldehyde. Where the drupe is added with the olive paste, between about 1% and 5% of the drupe is added against the weight of the olives or olive paste.

As an alternative procedure, the olive oil which may be used for blending with the refined deodorized glyceride oils or with the mineral oil may be infused with the ground drupes, the ground drupes having previously been prepared with a small proportion of water so as to develop the desirable benzaldehyde aroma, or the refined oils may first be infused or treated with the drupes in a manner to develop the desired minute amount of benzaldehyde.

The benzaldehyde used in accordance with the present invention may either be produced synthetically or it may be extracted from the amygdalin containing materials by solvent extraction or by distillation. The olives used for infusion in accordance with the present invention may be ripe or green, and preferably in dehydrated salted condition.

The method of infusing or treating the glyceride oil, particularly the olive oil blended glyceride oils or olive infused glyceride oils, with these drupes or with mixtures of drupes and olives is claimed in my copending application, Serial No. 406,649, filed August 31, 1941.

The present application is a continuation in part of application Serial No. 400,651, filed July 1, 1941.

Having described my invention, what I claim is:

1. A method of enhancing an olive flavor in an oil selected from the group consisting of the olive infused and olive oil blended glyceride and refined white mineral oils, which comprises adding thereto a small amount, less than 75 parts per million, of benzaldehyde.

2. A method of enhancing an olive flavor in an oil selected from the group consisting of the olive infused and olive oil blended glyceride and refined white mineral oils, which comprises adding thereto a small amount of benzaldehyde, insufficient to develop the characteristic benzaldehyde odor.

3. A method of enhancing an olive flavor in an olive infused glyceride oil which comprises adding thereto a small amount, less than 75 parts per million, of benzaldehyde.

4. A method of enhancing an olive odor in an olive oil blended glyceride oil which comprises adding thereto a small amount, less than 75 parts per million, of benzaldehyde.

5. An oil having an enhanced olive flavor and odor, said oil being selected from the group consisting of the olive infused and olive oil blended glyceride oils and refined white mineral oils, said oil containing a small amount, less than 75 parts per million, of benzaldehyde.

6. An oil having an enhanced olive flavor and odor, said oil being selected from the group consisting of the olive infused and olive oil blended glyceride oils and refined white mineral oils, said oil containing between 5 parts per million and 40 parts per million of benzaldehyde.

7. An olive oil blended glyceride oil having an enhanced olive flavor and odor, said oil containing a small amount of benzaldehyde, said amount being insufficient to give the oil a benzaldehyde odor.

8. An olive infused glyceride oil having an enhanced olive flavor and odor, said oil containing a small amount of benzaldehyde, said amount being insufficient to give the oil a benzaldehyde odor.

9. An olive oil blended refined white mineral oil having an enhanced olive flavor and odor, said oil containing a small amount, less than 75 parts per million, of benzaldehyde.

SIDNEY MUSHER.